United States Patent [19]

Korrenn et al.

[11] 4,099,801
[45] Jul. 11, 1978

[54] HEAVY-DUTY HYDROSTATIC BEARING

[75] Inventors: Heinz Korrenn, Obbach; Horst Voll, Hassfurt, both of Germany

[73] Assignee: Kugelfischer Georg Schäfer & Co. Schweinfurt, Germany

[21] Appl. No.: 753,778

[22] Filed: Dec. 23, 1976

[30] Foreign Application Priority Data

Dec. 24, 1975 [DE] Fed. Rep. of Germany ....... 2558678

[51] Int. Cl.² .............................................. F16C 7/04
[52] U.S. Cl. .................................. 308/9; 277/DIG. 5; 308/122; 308/DIG. 1; 308/72
[58] Field of Search ............. 266/78, 99; 277/DIG. 5; 308/9, 72, 122, DIG. 1

[56] References Cited

U.S. PATENT DOCUMENTS

| 3,622,213 | 11/1971 | Onsrud | 308/122 |
| 3,705,751 | 12/1972 | Dee | 308/9 |
| 3,753,604 | 8/1973 | Arsenius | 308/9 X |
| 4,005,916 | 2/1977 | Dillon | 308/122 X |

FOREIGN PATENT DOCUMENTS

| 2,225,360 | 12/1973 | Fed. Rep. of Germany | 308/9 |
| 805,824 | 12/1958 | United Kingdom | 308/9 |
| 192,555 | 6/1967 | U.S.S.R. | 308/9 |

Primary Examiner—Stephen G. Kunin
Attorney, Agent, or Firm—Karl F. Ross

[57] ABSTRACT

A hydrostatic journal bearing for a shaft of a heavy load, such as a metallurgical vessel, comprises an inner ring of spherical outer surface rigid with the shaft, a stationary base forming part of a housing, and a segmental shell resting on the base as a cradle for the ring. The upper shell surface has pockets for high-pressure oil, supporting the ring in operation, while the lower shell surface has similar pockets near its axially extending edges designed to maintain the shell curvature close to that of the ring. The shell may be split into two relatively axially shiftable coaxial subshells with further oil pockets at their interface.

10 Claims, 5 Drawing Figures

HEAVY-DUTY HYDROSTATIC BEARING

FIELD OF THE INVENTION

Our present invention relates to a hydrostatic journal bearing for a shaft of a metallurgical vessel or some other heavy load.

BACKGROUND OF THE INVENTION

In U.S. Pats. Nos. 3,746,328 and 3,853,361 there has been disclosed a hydrostatic bearing structure for tiltable converters or the like in which oil under high pressure is admitted to pockets (referred to as fluid bearing pads) on an inner peripheral surface of an annular bearing block surrounding a sleeve on the shaft which is to be rotatably supported. The sleeve and the bearing block may or may not be relatively shiftable in the axial direction, depending on whether the bearing is of the fixed type or the expansion type.

In order to minimize the outward leakage of high-pressure oil along the confronting surfaces between the sleeve and the bearing block, the gap existing in operation between these surfaces should be as narrow as possible.

During rotation, the sleeve hugging the shaft tends to heat up more rapidly than the surrounding bearing block which is cooled not only by the atmosphere but also by the circulating oil. This unequal expansion results in a relative deformation of the confronting surfaces which may, therefore, come into physical contact with each other, particularly near the bottom of the bearing. Such metal-to-metal contact can be prevented only by the use of a very high pumping pressure which also must take into account the unavoidable manufacturing tolerances of the bearing members.

OBJECT OF THE INVENTION

The object of our present invention is to provide an improved heavy-duty hydrostatic bearing for the purpose described which obviates these difficulties and insures the maintenance of the necessary clearance between confronting surfaces of two relatively rotating bearing members with only moderate oil pressures and under widely varying load and temperature conditions.

SUMMARY OF THE INVENTION

In our improved bearing structure the member referred to above as a bearing block is no longer annular but is a segmental shell, with a convex and a concave surface curved about the axis of rotation of the associated shaft. This segmental shell, serving as a cradle for the shaft-engaging bearing ring or sleeve in the region of maximum load, has a pair of axially extending edges which should be closely spaced from the surface of the rotating ring without ever touching that surface. In order to maintain this minimum spacing, we provide the shell at its convex (lower) surface with additional pockets for high-pressure fluid open toward a supporting surface of an underlying base or housing member. Through proper adjustment of the fluid pressure in these lower pockets, which are disposed near the axially extending shell edges, we can maintain the desired small distance between these edges and the rotating ring.

Since the region of maximum load will normally be at the bottom of the bearing, it is convenient to refer to upper and lower surfaces and pockets even though in certain instances a different orientation may have to be used.

In the case of an expansion bearing, in which the shaft-engaging ring must have a certain axial mobility relative to its base, the segmental bearing shell can be radially split into an upper subshell adjoining the ring and a lower subshell axially immobilized with reference to the base, these two subshells meeting at an interface along which they are relatively slidable. Pursuant to another feature of our invention, we provide either or both of these subshells with further pockets supplied with high-pressure fluid in order to separate them by a fluid cushion facilitating such relative motion.

Since the segmental shell (or its lower subshell) is stationary on a supporting surface of its base, the additional pockets for the control of the edge spacing could also be provided on that supporting surface in lieu of the convex shell surface. The provision of these pockets on the shell itself, however, eliminates the need for separate oil channels in the base.

The effect of the high-pressure fluid in the lower pockets upon the spacing of the shell edges from the outer surface of the rotating ring depends, of course, on the resilient deformability of the shell. In order to increase this deformability, we may split the shell along an axial plane into a pair of identical halves which are hingedly interconnected at the concave (upper) shell surface for independent upward swinging from a contiguous normal position.

BRIEF DESCRIPTION OF THE DRAWING

The above and other features of our invention will now be described in detail with reference to the accompanying drawing in which.

SPECIFIC DESCRIPTION

Figure 1:
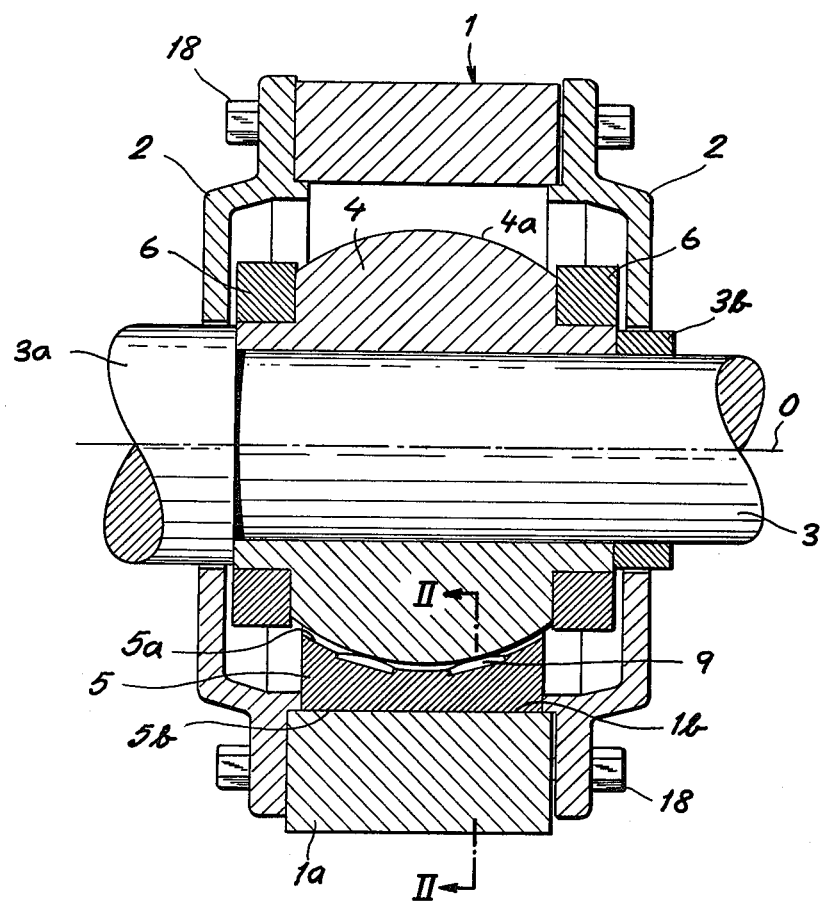
FIG. 1 is an axial sectional view of a fixed hydrostatic journal bearing embodying our invention.
Figure 2:
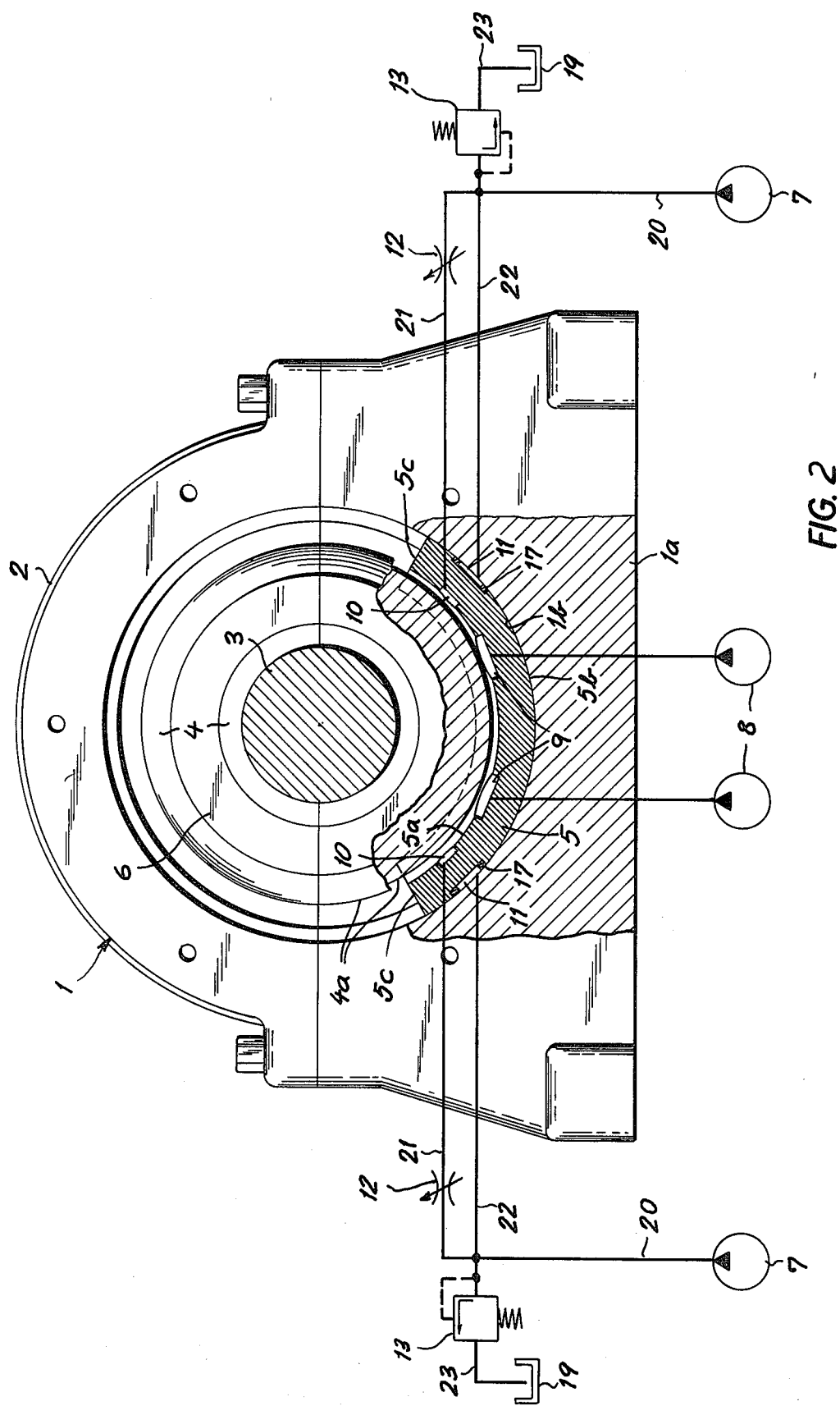
FIG. 2 is an end view of the bearing partly in section on the line II—II of FIG. 1, with a housing cheek removed.

In FIGS. 1 and 2 we have shown a hydrostatic journal bearing for a shaft 3 having a generally horizontal axis 0 which is hugged by a ring 4 rotatable therewith. For easier assembly, ring 4 is split into two halves held together by a pair of annular clamps 6. A housing 1 forms a base 1a flanked by a pair of cheeks 2, base 1a having a supporting surface 1b which is cylindrically curved about axis 0. A metallic shell 5, extending over an approximately quadrantal arc about axis 0, has a spherically concave upper surface 5a in which ring 4 is cradled with its similarly curved outer surface 4a, a cylindrically convex lower surface 5b of shell 5 resting on supporting surface 1b. Shell 5 is axially immobilized with reference to base 1a by cheeks 2, secured to it by screws 18 which have been omitted in FIG. 2. The axial position of ring 4 on shaft 3 is fixed by a shoulder 3a and a collar 3b so that the ring 4 and the shaft 3 are axially nonshiftable with reference to housing 1.

Shell 5 is provided along its concave surface 5a, confronting the ring surface 4a, with a number of inner and outer pockets 9 and 10 supplied with oil under pressure by respective pumps 8 and 7. In accordance with the teachings of the two U.S. patents referred to above, the oil in these pockets separates the two confronting surfaces 4a and 5a by a small gap which prevents any physical contact therebetween as the ring 4 rides on a thin film of oil. The liquid outflowing from that gap is collected and returned via nonillustrated channels to a sump 19 for recirculation to the pumps 7 and 8.

In accordance with our present invention, shell 5 is provided at its lower surface 5b with additional oil pockets 11 also supplied by pumps 7. As shown in FIG. 2, each pump 7 works into a high-pressure conduit 20 which splits into two branches 21 and 22 respectively terminating at an upper pocket 10 and at a lower pocket 11, branch 21 including an adjustable throttle 12 for reducing the oil pressure in pocket 10 with reference to that in pocket 11. A pressure-limiting valve 13 is inserted in a return conduit 23 leading from each conduit 20 back to the sump 19.

The lower pockets 11 are peripherally lined with annular gaskets 17 of rubber or the like designed to prevent any substantial loss of oil when the wings of shell 5, provided with these pockets and bounded by axially extending edges 5c, are lifted off the supporting surface 1b by the high-pressure oil as more fully discussed hereinafter. These gaskets, accordingly, should be so dimensioned as to project slightly from the pockets 11 (see FIG. 5) in the absence of load, i.e. when the shell 5 is separated from its base 1a.

When pumps 7 and 8 are not operating, ring 4 rests directly on its cradle constituted by shell 5. If the radii of their confronting surfaces 4a and 5a are identical, their separation under oil pressure in operation results in a slightly meniscus-shaped gap with greater spacing in the middle than at its ends, i.e. in the region of edges 5c. With ring 4 expanding more rapidly than shell 5 on being heated from the bottom of a nonillustrated converter carried by shaft 3, there is a danger of metallic contact between the ring and the shell at these edges.

If the radius of curvature of shell surface 5a is increased to prevent such contact, the gap widens toward these edges at least in the early stages of operation so that oil can escape more readily from it and the pressure in the gap drops.

The provision of lower pockets 11 in accordance with our present invention allows us to make the radius of surface 5a under no-load conditions slightly larger than that of ring surface 4a, the widening of the gap at edges 5c being avoided by the deformation of shell 5 under pressure of the oil in these pockets. When the bearing heats up so that ring 4 expands more rapidly than shell 5, the deformation of the shell can be reduced, if necessary, as by slowing down the pumps 7 (with a possible compensatory widening of the constriction of conduit branches 21 by adjustment of throttles 12). Naturally, other means for controlling the oil pressure — either manually or automatically, e.g. in response to temperature — could also be provided, including for example a pressure-regulating valve in each branch 22.

Figure 3:
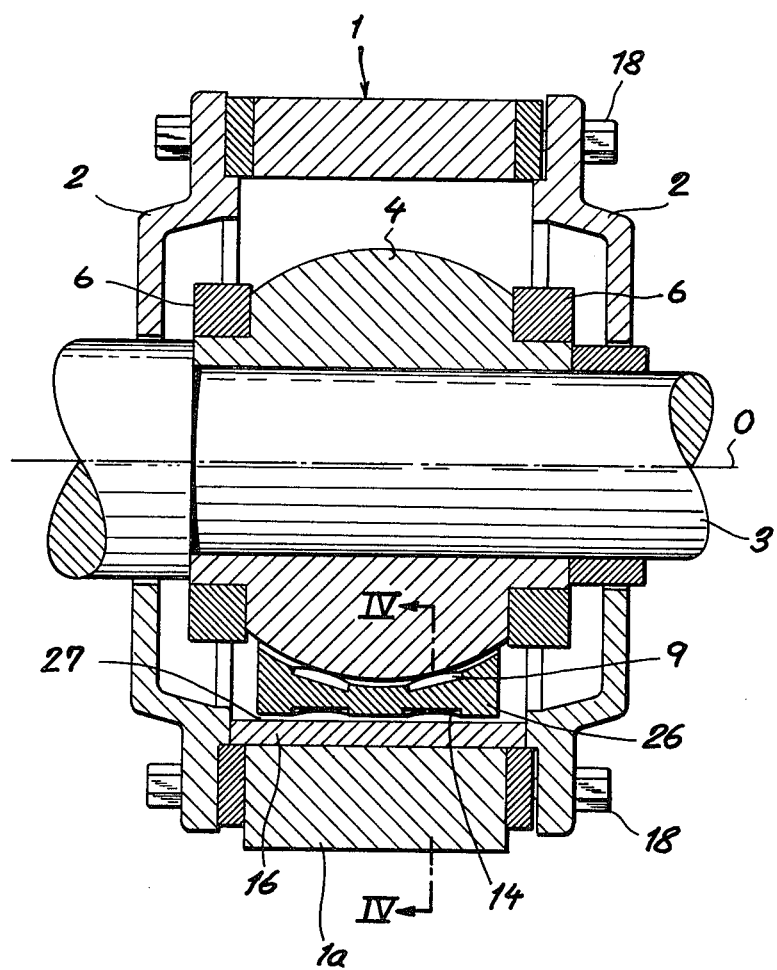
FIG. 3 is a view similar to FIG. 1 but illustrating a hydrostatic expansion bearing according to our invention.
Figure 4:
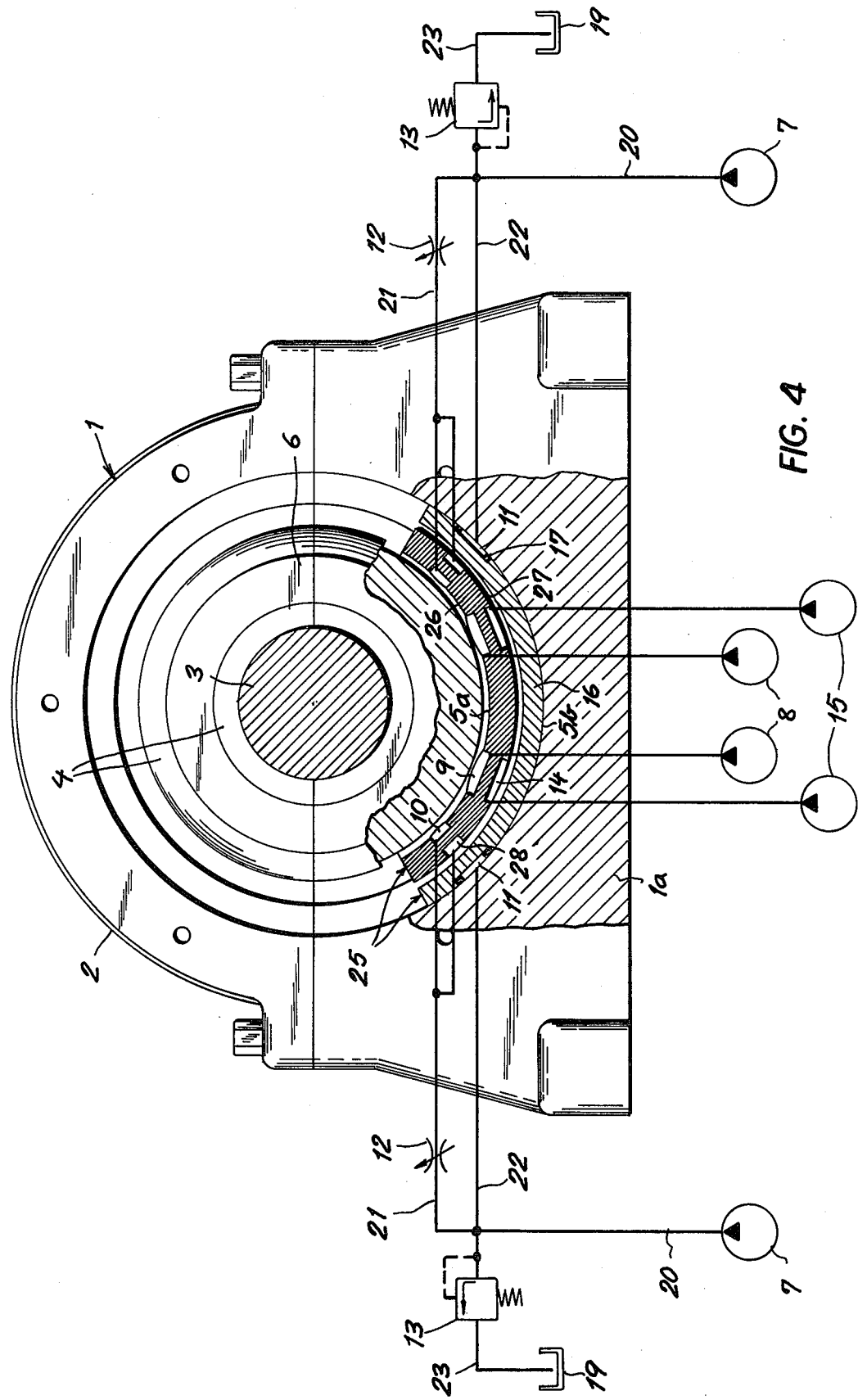
FIG. 4 is a view similar to FIG. 3, taken partly in section on the line IV—IV of FIG. 3.

FIGS. 3 and 4 show an expansion bearing embodying our invention, with corresponding elements identified by the same reference numerals as in FIGS. 1 and 2. This bearing comprises a shell 25 radially divided into two subshells 16 and 26, the lower subshell 16 resting on base 1a while the upper subshell 26 serves as a cradle for ring 4. Surfaces 5a and 5b of subshells 26 and 16 have the same curvature as in the preceding embodiment. The two subshells meet at an interface 27 which is cylindrically curved about axis 0 and enables their radial separation under the pressure of oil delivered to internal pockets 14 and 28 by means of pumps 15 and 7, these internal pockets being formed on the convex side of subshell 26.

As will be apparent from FIG. 3, housing cheeks 2 immobilize only the lower subshell 16 but allow a certain axial movement to upper subshell 26 and therefore to ring 4 and shaft 3.

In the system of FIGS. 3 and 4 the oil pressure developed in pockets 11 of subshell 16 is transmitted to the wings of subshell 26 through the oil cushion existing in operation within interface 27.

Figure 5:
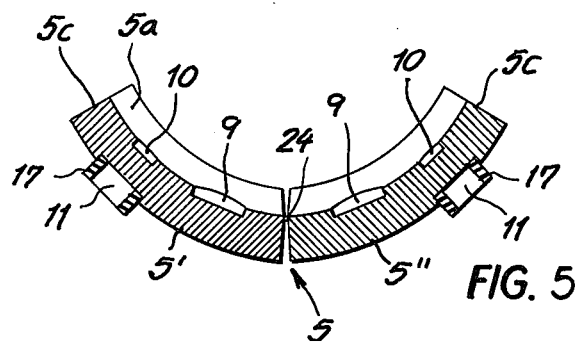
FIG. 5 is a cross-sectional view of an articulated bearing shell to be used in the structure of FIGS. 1 and 2.

In FIG. 5 we have shown the shell 5 divided into symmetrical halves 5' and 5" articulated to each other by a hinge 24. Oil pressure in pockets 11 causes these halves to separate slightly along their normally contiguous radial faces in the region of the hinge.

We claim:

1. A hydrostatic journal bearing comprising:
   a ring with a generally horizontal axis engageable with a shaft to be journaled in the bearing;
   a ring-segmental shell underneath said ring having a concave surface closely juxtaposed with part of an outer surface of said ring and substantially coaxial therewith, said shell extending about said axis over a portion of a circle and terminating in a pair of transverse edges substantially parallel to said axis;
   a base having an upper surface supporting said shell, the latter having a convex surface resting on said upper surface, at least one of said convex and upper surfaces being provided with a lower pocket of limited peripheral extent in the vicinity of each of said transverse edges, said concave surface being provided with a plurality of upper pockets opening onto said outer surface; and
   pump means communicating with said pockets for delivering a high-pressure fluid to said upper pockets under a pressure sufficient to prevent direct contact between said concave and outer surfaces and to said lower pockets under a localized pressure resiliently deforming said shell to control the separation of said concave surface from said outer surface at said transverse edges.

2. A bearing as defined in claim 1 wherein said convex surface and said upper surface are centered on the ring axis.

3. A bearing as defined in claim 2 wherein said concave surface and said outer surface are spherically curved, said convex surface and said upper surface being cylindrically curved.

4. A bearing as defined in claim 3 wherein said shell is radially split into an upper subshell and a lower subshell meeting along an interface cylindrically curved about the ring axis, at least one of said subshells being provided at said interface with further pockets communicating with said pump means for separating said subshells by a fluid cushion, said lower subshell being axially immobilized on said base, said upper subshell being axially slidable on said fluid cushion.

5. A bearing as defined in claim 1 wherein said pump means comprises a common pump connected by a first conduit with at least one upper pocket and by a second conduit with at least one lower pocket, further comprising adjustable throttle means in one of said conduits for varying the relative pressure in said upper and lower pockets.

6. A bearing as defined in claim 1 wherein said shell is split into a pair of symmetrical halves each bounded by one of said transverse edges, said halves being hingedly interconnected for independent upward swinging from a contiguous normal position.

7. A bearing as defined in claim 1, further comprising a resilient annular gasket lining each of said lower pockets, said gasket projecting out of its pocket upon separation of said convex and upper surfaces from each other.

8. A bearing as defined in claim 1 wherein said lower pockets are formed in said convex surface.

9. A bearing as defined in claim 1 wherein said shell extends over approximately one quadrant around the ring axis.

10. A bearing as defined in claim 1 wherein said concave surface has a radius of curvature slightly exceeding that of said outer surface at normal temperatures.

* * * * *